(12) United States Patent
Shoobridge

(10) Patent No.: US 6,603,400 B1
(45) Date of Patent: Aug. 5, 2003

(54) PAPER CAPACITOR

(75) Inventor: Richard Allen Shoobridge, The Woodlands, TX (US)

(73) Assignee: Telxon Corporation, Holtsville, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/564,625

(22) Filed: May 4, 2000

(51) Int. Cl.$^7$ ................................................ G08B 13/14
(52) U.S. Cl. ............................... 340/572.1; 340/572.4; 340/572.8; 340/10.34
(58) Field of Search ........................... 340/572.1, 572.4, 340/572.7, 10.1, 10.33, 10.34, 572.8; 320/166, DIG. 23; 307/109, 110

(56) References Cited

U.S. PATENT DOCUMENTS

| 4,138,686 A | 2/1979 | Graf ............................ 347/74 |
| 4,288,796 A | 9/1981 | Aiba et al. ..................... 347/80 |
| 5,300,875 A | 4/1994 | Tuttle ........................... 320/138 |
| 5,448,110 A | * 9/1995 | Tuttle et al. ................. 257/723 |
| 5,530,702 A | 6/1996 | Palmer et al. ................ 370/445 |
| 5,785,181 A | 7/1998 | Quartararo, Jr. ............ 209/3.3 |
| 5,815,355 A | 9/1998 | Dawes ......................... 361/56 |
| 5,945,920 A | 8/1999 | Maletsky ................. 340/10.52 |
| 5,973,598 A | * 10/1999 | Beigel ..................... 340/572.1 |
| 5,986,562 A | 11/1999 | Nikolich ................. 340/693.5 |
| 6,018,299 A | * 1/2000 | Eberhardt ................ 340/572.7 |
| 6,025,780 A | 2/2000 | Bowers et al. .......... 340/572.3 |
| 6,078,791 A | * 6/2000 | Tuttle et al. ................. 455/90 |
| 6,104,311 A | * 8/2000 | Lastinger .................. 340/10.1 |

* cited by examiner

*Primary Examiner*—Toan Pham
(74) *Attorney, Agent, or Firm*—Amin & Turocy, LLP

(57) ABSTRACT

An RFID tag system is provided that is convertable from a passive system to an active system. This is accomplished by providing chargeable ink wells on the RFID tag system that can provide power to components in the RFID tag system. The power provides the components with power to communicate messages between the RFID tag system and a base unit. The chargeable ink wells are formed by printing a conductive ink onto the RFID tag system. The conductive ink forms a capacitive well having stored up energy upon charging of the conductive ink. The ink can be charged prior to printing on the RFID tag system or charged after the ink is printed onto the RFID tag system. The printed wells can be formed similar to large capacitive plates. The capacitive wells can also be formed from printed features such as a barcode or such as a group of alphanumeric characters.

24 Claims, 6 Drawing Sheets

PAPER CAPACITOR

TECHNICAL FIELD

The present invention relates to radio frequency identification (RFID) tag systems and more particularly to an RFID tag system that employs a chargeable ink as a power source.

BACKGROUND OF THE INVENTION

Remote electronic identification devices have been employed in a variety of industries. For example, stores place RFID tags on articles of clothing and other types of goods. An unauthorized removal of a good carrying an RFID tag causes a signal to be transmitted to an electronic security system. The RFID tag will receive a signal from the electronic security system placed near an exit, and transmit a response informing the electronic security system of the presence of an article being passed through the electronic security system and removed from the store. An alarm can then be invoked to inform store personnel that an article is being removed without authorization. Additionally, RFID tags have been employed in warehouses and other businesses to ensure accurate inventory counts. RFID tags have also been utilized in performing inventory counts in trucks and other vehicles.

There are two different types of remote electronic devices. The first type is known as an active RFID system and the second type is known as a passive RFID system. An active RFID system includes a battery powered transponder (i.e., a receiver and a transmitter), which can receive signals from a base station or interrogator and transmit identification information back to the interrogator. A passive RFID systems receives its power directly from the base station or interrogator and typically stores this power in a storage device. The power allows for the passive RFID system to transmit identification information to the base station or interrogator. The problem with the passive RFID system is that it has limited power transmission capabilities. Typically, the passive RFID system can only transmit identification information to a range of about two feet. Additionally, the passive RFID system can only store the power received by the interrogator for two to three seconds. Active RFID systems transmit identification information at a much higher range and can store energy as long as the battery remains at a charge level high enough to transmit. However, active RFID systems are much larger and more unsightly than passive RFID systems.

Accordingly, there is a strong need in the art for an RFID tag having the transmission power of an active RFID tag, while retaining the advantages of a passive RFID tag.

SUMMARY OF THE INVENTION

According to a preferred aspect of the invention, an RFID tag system is provided that is convertable from a passive system to an active system. Capacitive wells are provided on the. RFID tag system that can retain energy for a period of about 24 hours. The capacitive wells provide power to the active components on the RFID tag system for reception and communication of messages between the RFID tag system and a base unit. Preferably, the capacitive wells are formed by printing a conductive ink onto the RFID tag system. The conductive ink forms a capacitive well having stored up energy upon charging of the conductive ink. Present passive RFID tags can be provided on paper thin labels with active components embossed therein. Chargeable ink can be printed onto printable regions on the back or front of the labels. Interconnects and contacts connect the chargeable ink to the active components on the RFID tag system. The ink can be charged prior to printing on the RFID tag system or charged after the ink is printed onto the RFID tag system. The printed wells can be formed similar to large capacitive plates. The capacitive wells can also be formed from printed features such as a barcode or such as group of alphanumeric characters. The printed features can also provide the RFID tags with a human or machine readable features in addition to providing the RFID tag with a capacitive well.

Thus, according to one aspect of the present invention, an RFID tag system is provided. The RFID tag system comprises an active component module, a transceiver module coupled to the active component module and a chargeable ink well printed on the RFID tag system. The chargeable ink well is adapted to provide power to the active component module and the transceiver module. The chargeable ink well can be charged prior to or after it is printed on the RFID tag system. A recharge system can be provided on the RFID tag system for charging or recharging the chargeable ink well. Preferably, the RFID tag system is shaped like a label having a front side and a rear side. The chargeable ink well can be printed on the rear or front of the label. The chargeable ink well can include any printable feature or combination of printable features, such as a printed plates, barcode labels and/or alphanumeric characters.

In accordance with another aspect of the present invention, a method of forming an RFID tag system is provided. The method comprises the steps of providing an RFID tag having components for transmitting and receiving messages and printing a printable feature with a chargeable ink on an RFID tag. The printable feature is coupled to the components for providing power to the components. The chargeable ink well can be charged prior to or after the step of printing the chargeable ink well on the RFID tag system. In one aspect of the invention, the chargeable ink well is charged by providing a magnetic field. In another aspect of the invention, the chargeable ink is charged by providing a power transmission signal. The chargeable ink well can include any printable feature or combination of printable features, such as a printed plates, barcode labels and/or alphanumeric characters.

In accordance with yet another aspect of the present invention, an RFID tag system is provided. The RFID tag system comprises means for transmitting and receiving messages and a chargeable ink well printed on the RFID tag system. The RFID tag system can include means for receiving and harnessing a charge signal to charge the chargeable ink. The RFID tag system can also include means for storing RFID tag system identification information.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1A:
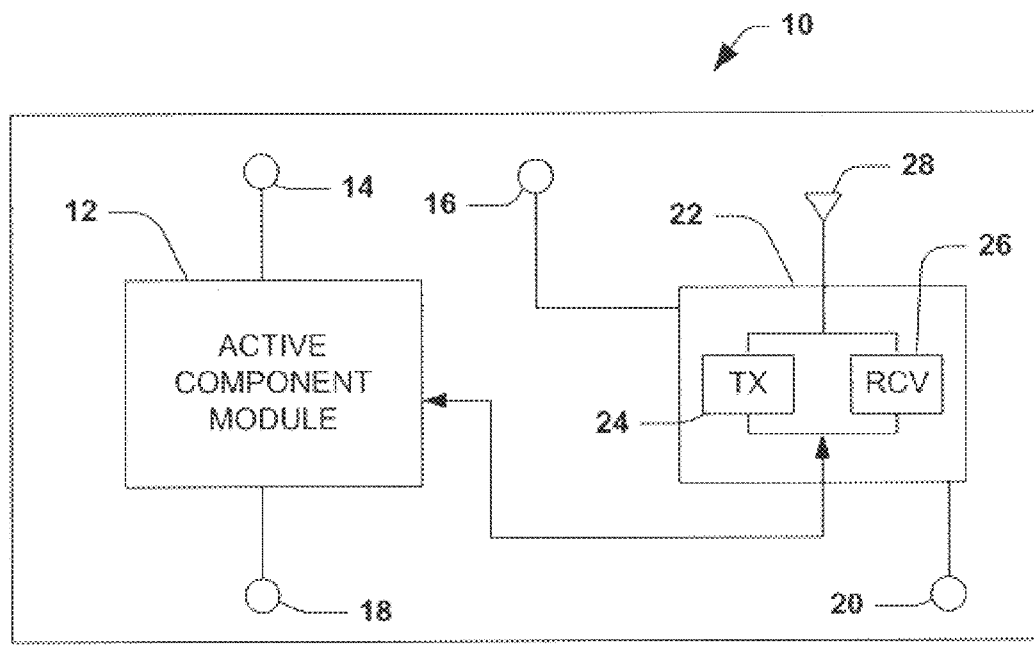
FIG. 1a illustrates a front view diagram of an RFID tag system in accordance with one aspect of the present invention.

The present invention will now be described with reference to the drawings, wherein like reference numerals are used to refer to like elements throughout. The present invention will be described with reference to an RFID tag that includes a chargeable ink printed thereon. It should be understood that the description of these features are merely illustrative and that they should not be taken in a limiting sense.

FIG. 1a illustrates a front view of an RFID tag system 10 having an active component module 12 coupled to a transceiver component 22. The active component module 12 is coupled to a first contact 14 and a second contact 18 by interconnect lines. The first and second contacts 14 and 18 couple the active component module 12 to a printed chargeable ink well on the rear side of the RFID tag system 10. The active component module 12 can include all necessary circuitry for processing receipt of messages from a base station (not shown) or interrogator, in addition to transmission of identification information from the RFID tag system 10. For example, the active component module 12 can include a processor for processing the receipt of messages and a memory for storing RFID tag system identification information. The processor and/or memory can also include the necessary software for receiving and transmitting messages to and from a base station. The transceiver module 22 includes a receiver component 26 adapted to receive transmissions from a base station. The transceiver module 22 also includes a transmitter component 24 adapted to transmit transmissions from the RFID tag system 10 to a base station. The receiver component 26 and the transmitter component 24 are both coupled to an antenna 28, in addition to the active component module 12. The transceiver module 22 is connected to a first contact 16 and a second contact 20 by interconnect lines. The first and second contacts 16 and 20 couple the transceiver 22 to a chargeable ink well printed on the rear of the RFID tag system 10.

Figure 1B:
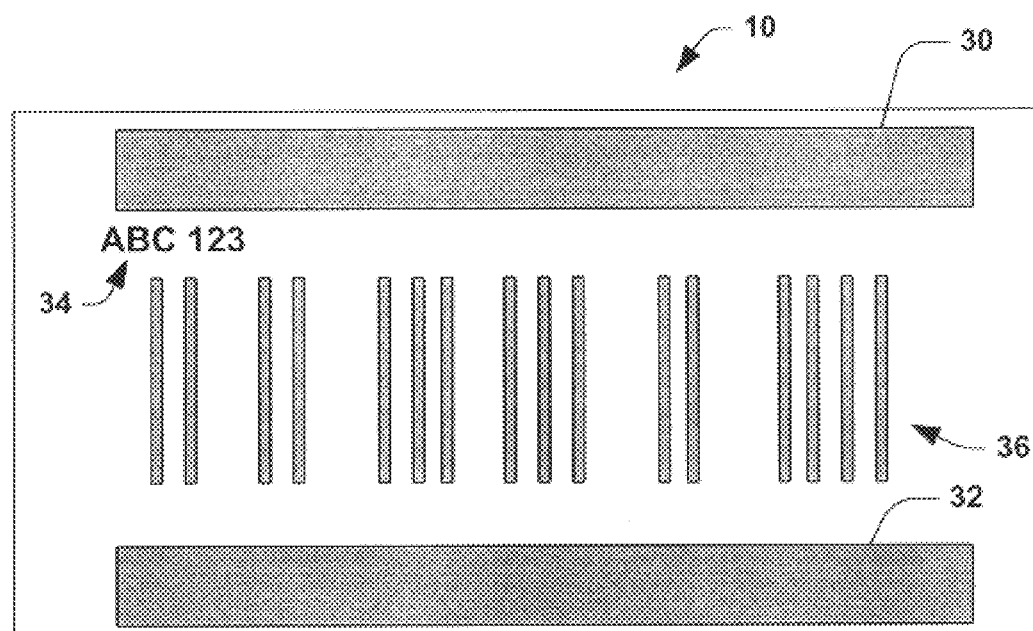
FIG. 1b illustrates a rear view diagram of the RFID tag system of FIG. 1a in accordance with one aspect of the present invention.
Figure 2:
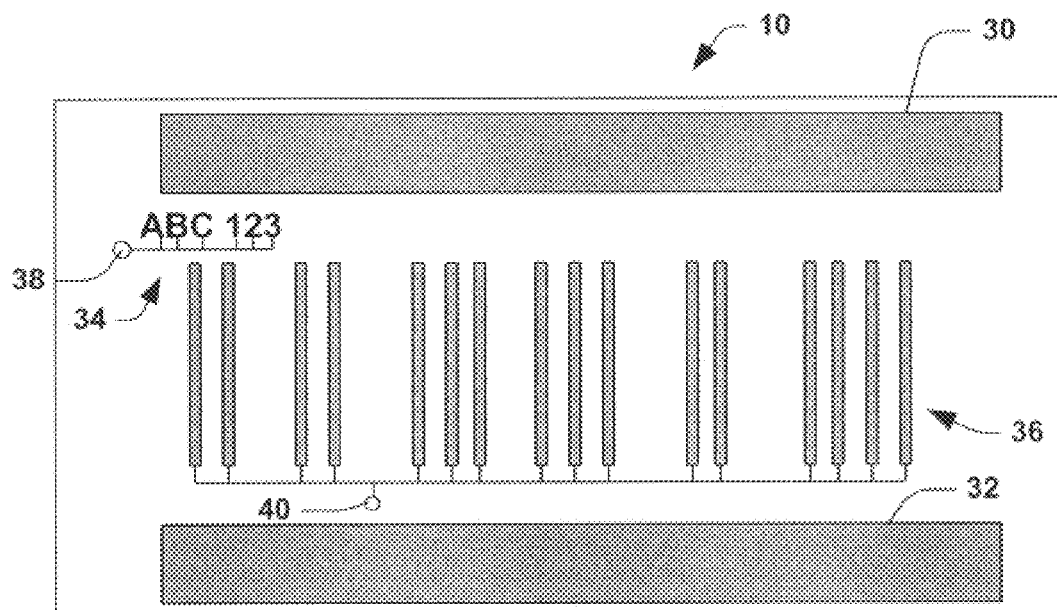
FIG. 2 illustrates a rear view diagram of an alternate RFID tag system in accordance with one aspect of the present invention.

FIG. 1b illustrates a rear view of the RFID tag system 10. The rear of the RFID tag system 10 includes a first printed ink plate 30 and a second printed ink plate 32. The printed ink plates form the chargeable ink well. The ink employed in printing the ink plates is a chargeable ink. The ink can be charge prior to printing or after printing. The printed ink is connected to the active component module 12 and the transceiver component module 22 via the contacts 14, 16, 18 and 20 coupled by the corresponding interconnect lines. A human readable text 34 and a machine readable barcode 36 are also printed on the rear of the RFID tag system 10. FIG. 2 illustrates the rear view of the RFID tag system 10 where the human readable text 34 and the barcode 36 can also be employed as chargeable energy sources. The alphanumeric characters of the human readable text 34 are interconnected to a contact 38 that extends to the front of the RFID tag system 10. The bars of the bar code 36 are interconnected to a contact 40 that extends to the front of the RFID tag system 10. It is to be appreciated that any printable features implementing chargeable ink can be charged and employed as energy sources for the RFID tag system 10.

Figure 3:
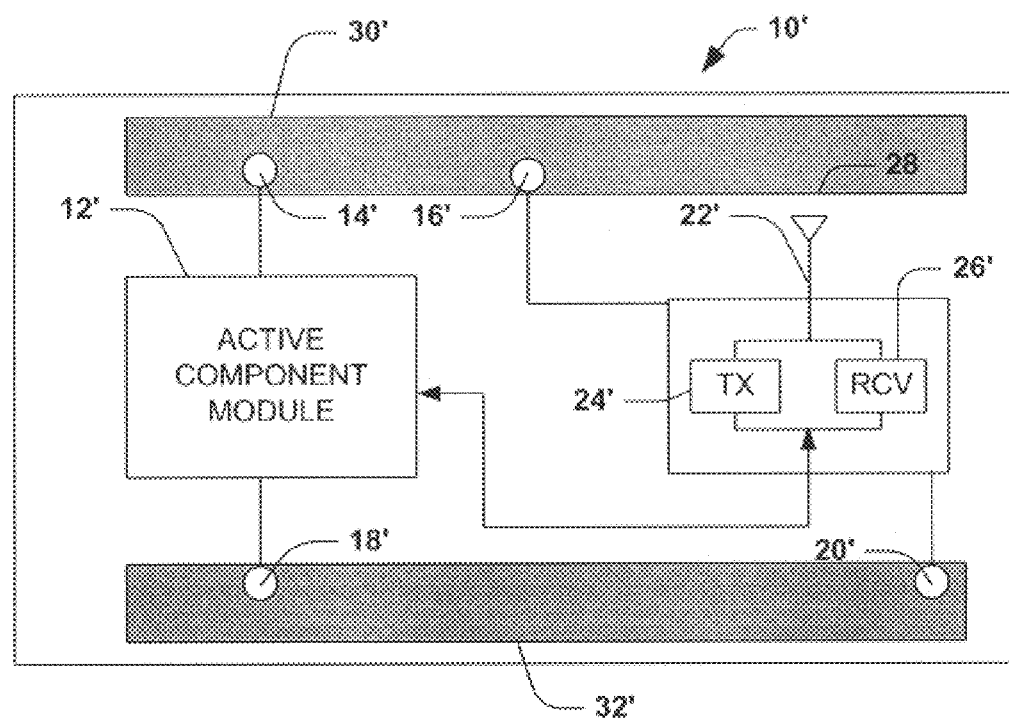
FIG. 3 illustrates a front view diagram of another alternate RFID tag system in accordance with one aspect of the present invention.

It is to be appreciated that the printed features do not necessarily have to be printed on the rear of the identification tag system 10. For example, FIG. 3 illustrates printing a first chargeable ink plate 30' and a second chargeable ink plate 32' on the front of an RFID tag system 10'. The RFID tag system 10' includes an active component module 12' coupled to a transceiver component 22'. The active component module 12' is coupled to a first contact 14' and a second contact 18' by interconnect lines. The transceiver module 22 is coupled to a first contact 16' and a second contact 20' by interconnect lines. The interconnect lines can also be formed by the printing of chargeable ink. The first contact 14' couples the active component module 12' to the first chargeable ink plate 30' and the second contact 18' couples the active component module to the second chargeable ink plate 30'. The active component module 12' can include all the necessary circuitry for processing the receipt of messages from a base station (not shown) or interrogator, in addition to transmission of identification information from the RFID tag system 10', similar to the system 10 illustrated in FIGS. 1a–1b. The transceiver module 22' includes a receiver component 26' adapted to receive transmission from a base station. The transceiver module 22' also includes a transmitter component 24' adapted to transmit transmissions from the RFID tag system 10' to the base station. The receiver component 26' and the transmitter component 24' are both coupled to an antenna 28' and the active component module 12'. The transceiver module 22' is connected to the first ink plate 30' by a first contact 16' and to the second ink plate 32' by a second contact 20'.

Figure 4:
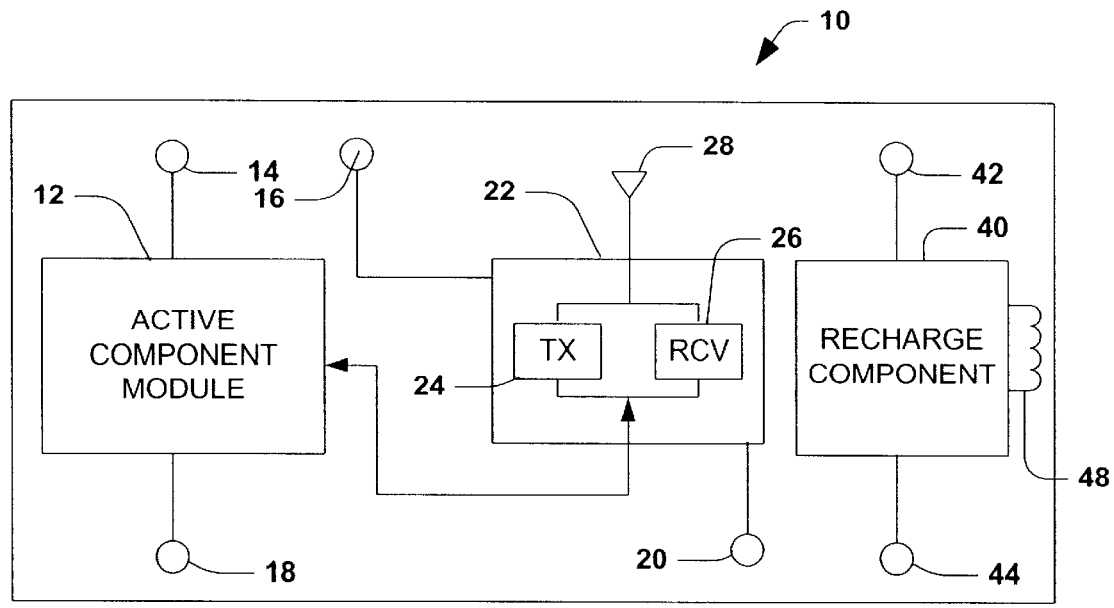
FIG. 4 illustrates a front view diagram of the RFID tag system of FIG. 1a with a recharge component coupled to a coil in accordance with one aspect of the present invention.

As previously stated, the printed chargeable ink may be charged prior to applying the ink onto the RFID tag system or the printed chargeable ink may be charged after the ink is applied. For example, the capacitive ink plates can be recharged by exposing the plates to a magnetic field and inducing a current in the plates. The charge on the chargeable ink plates typically can last for up to 24 hours or more based on the size of the plates. However, eventually the plates will discharge. A recharging device can be employed to recharge the plate in a similar manner. Many methods may be employed for charging or recharging the chargeable ink disposed on the RFID tag system 10. FIG. 4 illustrates providing a recharge component 40 with the RFID tag system 10. The recharge component 40 is coupled to a coil 48. The recharge component 40 is coupled to the chargeable ink plates via a contact 42 and a contact 44. A probe (not shown) can be used for providing a magnetic field that can be placed near the RFID tag system 10. The magnetic field induces a current in the coil, which is harness by the recharge component 40. The recharge component 40 provides the necessary recharge current to the printed chargeable ink plates to recharge the ink plates.

Figure 5:
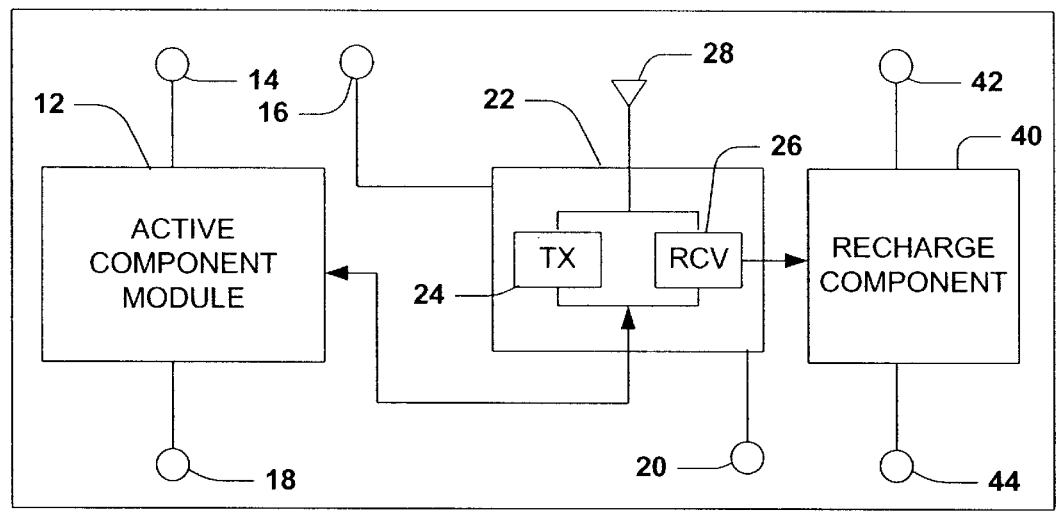
FIG. 5 illustrates a front view diagram of the RFID tag system of FIG. 1a with a recharge component coupled to an antenna in accordance with one aspect of the present invention.
Figure 6:
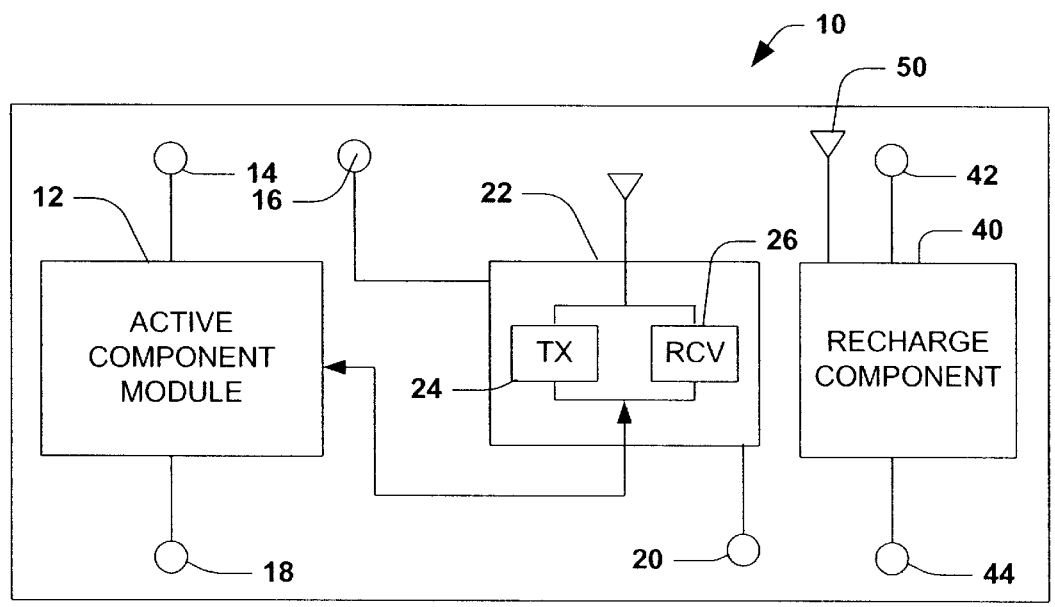
FIG. 6 illustrates a front view diagram of the RFID tag system of FIG. 1a with a recharge component coupled to another antenna in accordance with one aspect of the present invention.

It is to be appreciated that the chargeable ink may be charged or recharged by receipt of a power transmission signal from an alternate source, such as a base station or interrogator. FIG. 5 illustrates the RFID tag 10 including the recharge component 40. However, the recharge component 40 is coupled to the receiver component 26 of the transceiver module 22. A switch (not shown) can be placed in the receiver component 26 that switches transmission to the recharge component 40, if the energy on the printed chargeable ink falls below a level necessary for operation of the active component module 12. A power transmission can be transmitted to the RFID tag system 10, which is received by the antenna 28 and directed to the recharge component 40. The power transmission charges the printed chargeable ink on the rear of the RFID tag component 10. FIG. 6 illustrates the RFID tag component 10 having the recharge circuit component 40 with a separate antenna 50 for receiving power transmission signals. This allows for recharging the chargeable ink independent of the transmission and reception of signals to the active component module 12. It is to be appreciated that numerous systems and methodologies apparent to those skilled in the art may be employed to recharge the chargeable ink printed on the RFID tag system 10. For example, an electronic system may be setup at the entrance of a truck or warehouse. Moving the RFID tag system through the electronic system charges up the ink wells on the RFID tag system.

Figure 7:
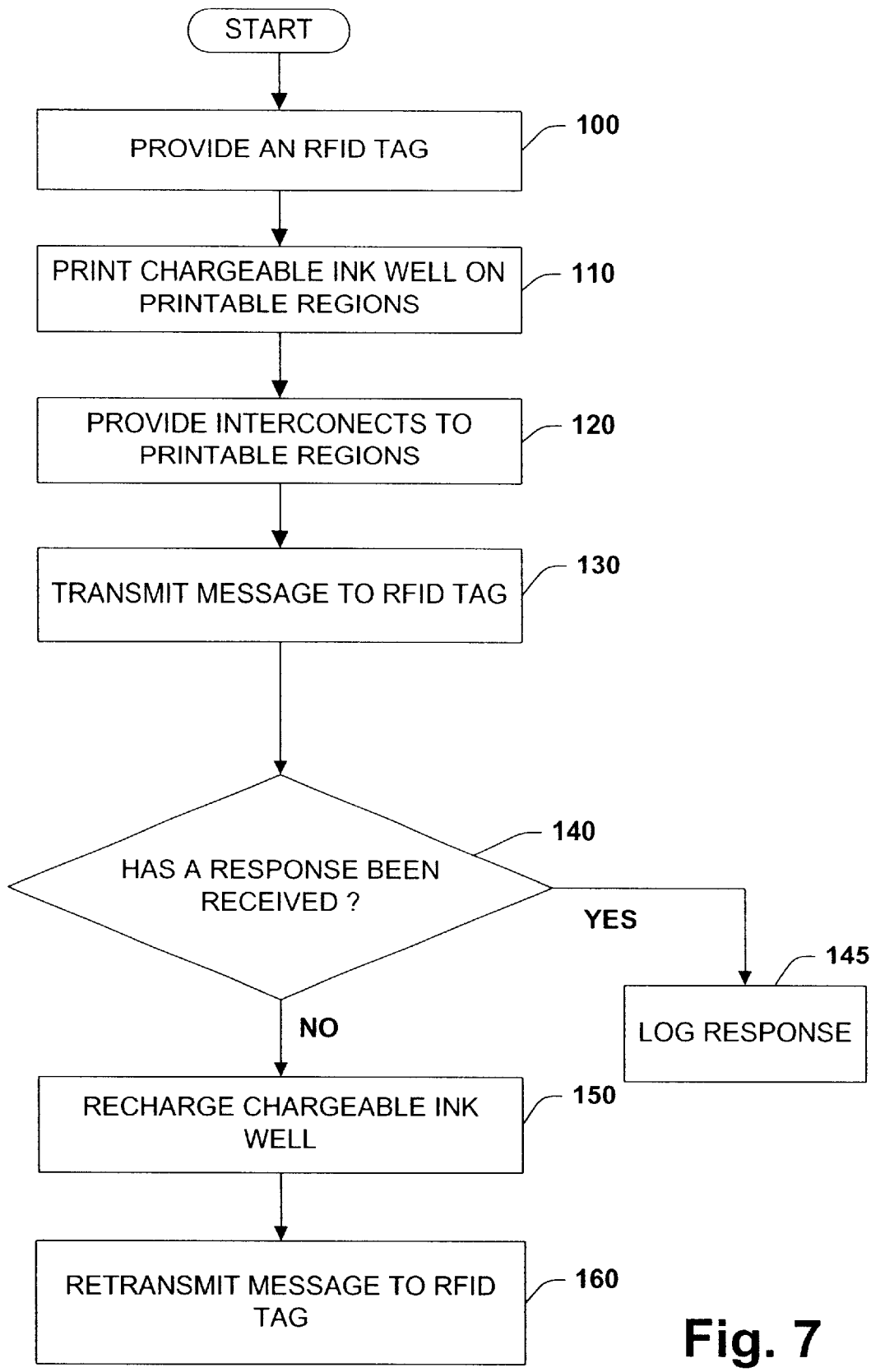
FIG. 7 illustrates a flow diagram for one specific methodology for providing and testing an RFID tag system in accordance with the present invention.

FIG. 7 illustrates a methodology for forming and testing an RFID tag of the present invention. Beginning in step 100, an RFID tag 10 is provided. In step 110, a chargeable ink well is printed on printable regions of the RFID tag 10. In step 120, the contacts and interconnects are provided connecting the active component module and the transceiver module to the printable regions. In step 130, a transmit message is sent to the RFID tag system 10 by a base station. The base station determines whether or not a response has been received in step 140. If a response has been received (YES), the response is logged in step 145. If a response has not been received (NO), the chargeable ink well is recharged by inducing a current, transmitting a power transmission from the base station or some other method for charging the chargeable ink well in step 150. The base station then retransmits the message to the RFID tag system 10 in step 160.

Figure 8:
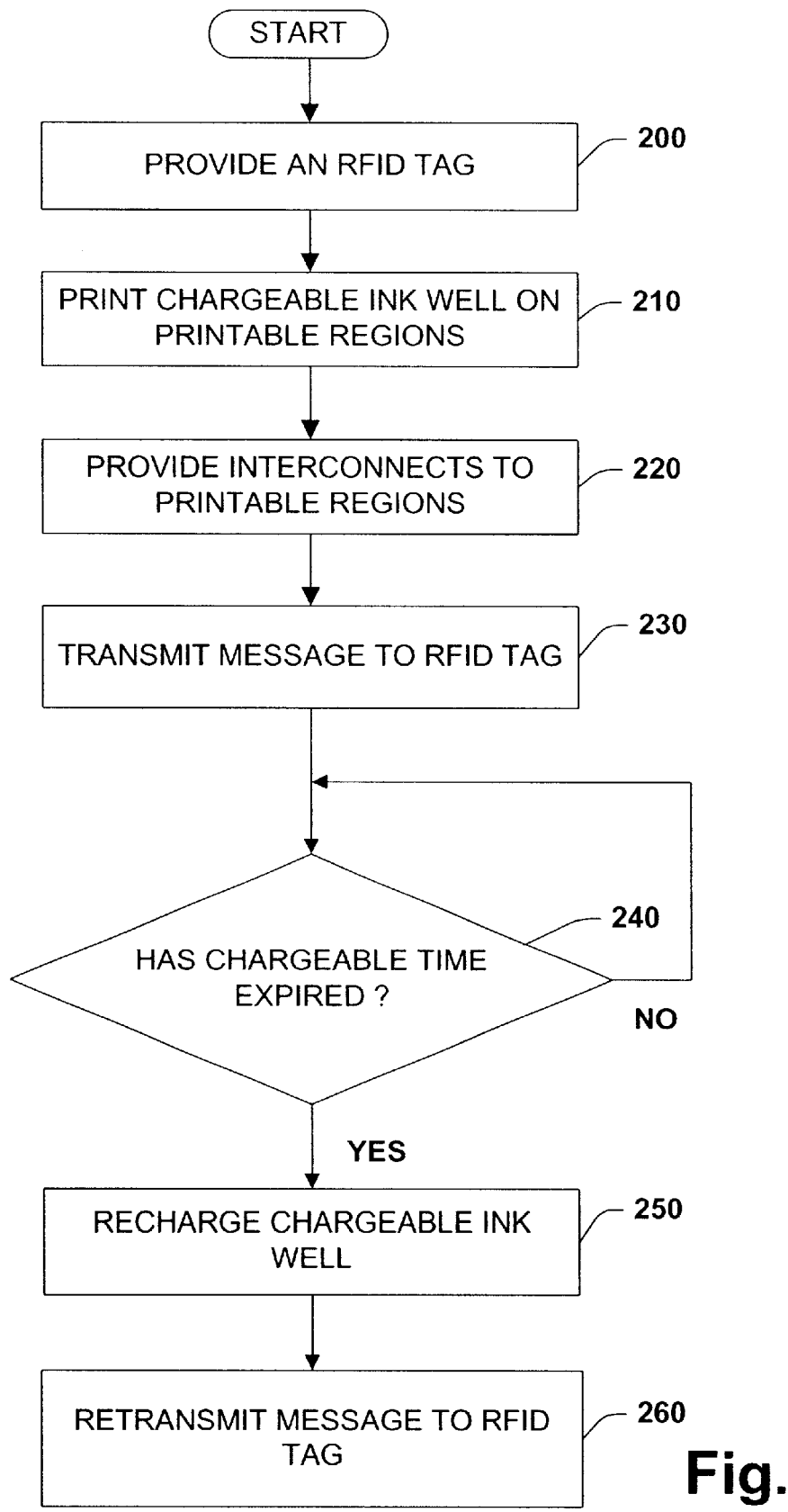
FIG. 8 illustrates a flow diagram for one specific methodology for providing and charging an RFID tag system in accordance with the present invention.

FIG. 8 illustrates a methodology for forming and recharging an RFID tag of the present invention. Beginning in step 200, an RFID tag 10 is provided. In step 210, a chargeable ink well is printed on printable regions of the RFID tag 10. In step 220, the contacts and interconnects are provided connecting the active component module and the transceiver module to the printable regions. In step 230, a transmit message is sent to the RFID tag system 10 by a base station to verify that it is operating. The base station determines whether or not a predetermined charge period has expired in step 240. If a predetermined time period has not expired (NO) step 240 is repeated. If a predetermined time period has expired (YES), the chargeable ink well is recharged by inducing a current, transmitting a power transmission from the base station or some other method for charging the chargeable ink in step 250. The base station then retransmits a message to the RFID tag system 10 to verify that it is operating in step 260.

The invention has been described with reference to preferred aspects. Obviously, modifications and alterations will occur to others upon reading and understanding the preceding detailed description. It is intended that the invention be construed as including all such modifications alterations, and equivalents thereof.

What is claimed is:

1. An RFID tag system comprising;
   an active component module;
   a transceiver module coupled to the active component module; and
   a chargeable ink well printed on the RFID tag system, the chargeable ink well employed as an energy source that provides power to the active component module and the transceiver module for an extended period of time.

2. The system of claim 1, wherein the chargeable ink well is formed from a first ink plate and a second ink plate.

3. The system of claim 1, wherein the chargeable ink well is charged prior to printing onto the RFID tag system.

4. The system of claim 1, wherein the chargeable ink well is charged after it is printed onto the RFID tag system and the extended period of time is about 24 hours.

5. The system of claim 1, wherein the chargeable ink well is formed from a barcode label printed on the RFID tag system.

6. The system of claim 1, wherein the chargeable ink well is formed from alphanumeric characters printed on the RFID tag system.

7. The system of claim 1, the active component module including a processor for processing and transmitting messages and a memory for storing RFID tag system identification information.

8. The system of claim 1, the transceiver module including a receiver component and a transceiver component both coupled to an antenna.

9. The system of claim 1, the RFID tag system being shaped in the form of a label having a first side and a second side, the active component module and the transceiver module being disposed on the first side and the chargeable ink well being disposed on the second side.

10. The system of claim 9, wherein the chargeable ink well is coupled to the active component module and the transceiver module by a contact extending through the first side to the second side of the RFID tag system.

11. The system of claim 1, the RFID tag system being shaped in the form of a label having a first side and a second side, the active component module and the transceiver module being disposed on the first side and the chargeable ink well being disposed on the first side.

12. The system of claim 1, further including a recharge component coupled to the chargeable ink well, the recharge component being adapted to receive a signal from a source and provided a charge to the capacitive chargeable ink well.

13. The system of claim 12, the recharge component being coupled to a coil and the source being a magnetic source wherein a magnetic field induces a current in the coil that is harnessed by the recharge component to charge the chargeable ink well.

14. The system of claim 12, the recharge component being coupled to an antenna and the source being a power transmission signal wherein the recharge component harnesses the power transmission signal to charge the chargeable ink well.

15. A method of forming an RFID tag system comprising;
    providing an RFID tag having components for transmitting and receiving messages;
    printing a printable feature with a chargeable ink on a single side of an RFID tag, the printable feature being employed as an energy source that provides power to the components for an extended period of time; and providing a recharge component coupled to the printable feature for charging the chargeable ink.

16. The method of claim 15, wherein printing a printable feature includes the step of printing a first ink plate and a second ink plate.

17. The method of claim 15, wherein printing a printable feature includes the step of printing a barcode label on the RFID tag system.

18. The method of claim 15, wherein printing a printable feature includes the step of printing alphanumeric characters on the RFID tag system.

19. The method of claim 15, further including charging the chargeable ink prior to the step of printing.

20. The method of claim 15, further including charging the chargeable ink after the step of printing.

21. The method of claim 20, wherein charging the chargeable ink after the step of printing includes subjecting the RFID tag system to a magnetic field.

22. The method of claim 20, wherein charging the chargeable ink after the step of printing includes transmitting a power transmission signal to the RFID tag system.

23. An RFID tag system comprising;

means for transmitting and receiving messages;

a chargeable ink well printed on a single side of the RFID tag system, the chargeable ink well employed as an energy source that provides power for an extended period of time of about 24 hours to the means for transmitting and receiving messages; and means for receiving and harnessing a charge signal to charge the chargeable ink well.

24. The system of claim 23, further including means for storing RFID tag system identification information.

* * * * *